(12) United States Patent
Patel et al.

(10) Patent No.: US 8,930,313 B2
(45) Date of Patent: Jan. 6, 2015

(54) SYSTEM AND METHOD FOR MANAGING REPLICATION IN AN OBJECT STORAGE SYSTEM

(71) Applicant: Dell Products L.P., Round Rock, TX (US)

(72) Inventors: Dharmesh Patel, Round Rock, TX (US); Farzad Khosrowpour, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 13/867,891

(22) Filed: Apr. 22, 2013

(65) Prior Publication Data

US 2013/0232313 A1 Sep. 5, 2013

Related U.S. Application Data

(63) Continuation of application No. 13/106,320, filed on May 12, 2011, now Pat. No. 8,433,681.

(51) Int. Cl.

| G06F 7/02  | (2006.01) |
| G06F 17/30 | (2006.01) |
| G06F 3/06  | (2006.01) |
| G06F 11/00 | (2006.01) |
| G06F 11/20 | (2006.01) |

(52) U.S. Cl.
CPC .......... *G06F 3/065* (2013.01); *G06F 17/30575* (2013.01); *G06F 11/006* (2013.01); *G06F 11/2094* (2013.01)

USPC ........... 707/634; 707/638; 707/741; 707/812

(58) Field of Classification Search
CPC ... G06F 17/30575; G06F 3/065; G06F 3/067; G06F 17/30082
See application file for complete search history.

(56) References Cited

U.S. PATENT DOCUMENTS

| 7,769,722 | B1 * | 8/2010 | Bergant et al. ................ 707/681 |
| 7,861,049 | B2 | 12/2010 | Otani et al. |
| 2009/0222415 | A1 | 9/2009 | Mimatsu et al. |
| 2010/0122148 | A1 | 5/2010 | Flynn et al. |
| 2010/0161554 | A1 | 6/2010 | Datuashvili et al. |
| 2010/0268902 | A1 | 10/2010 | Drobychev et al. |
| 2011/0196882 | A1 * | 8/2011 | Kesselman .................... 707/753 |
| 2012/0011340 | A1 | 1/2012 | Flynn et al. |
| 2013/0212165 | A1 * | 8/2013 | Vermeulen et al. .......... 709/203 |

* cited by examiner

*Primary Examiner* — Bruce Moser
(74) *Attorney, Agent, or Firm* — Terrile, Cannatti, Chambers & Holland, LLP; Robert W. Holland

(57) ABSTRACT

An object storage system, such as a content addressed storage system, manages replication of objects across network locations to balance storage space and data security. Network locations set a policy of replicating each object at the object's primary network location and a secondary network location. The secondary network location creates a first replica of the object and a virtual unique identifier representing a second replica of the object at the secondary network location. Creation of the second replica is suppressed unless the first replica becomes invalid so that storage space is conserved without substantially increasing the risk of loss of information represented by the object.

18 Claims, 4 Drawing Sheets

SYSTEM AND METHOD FOR MANAGING REPLICATION IN AN OBJECT STORAGE SYSTEM

CROSS-REFERENCE TO RELATED APPLICATION

This application is a continuation of co-pending application Ser. No. 13/106,320, filed May 12, 2011, which is incorporated herein by reference in its entirety.

BACKGROUND OF THE INVENTION

1. Field of the Invention

The present invention relates in general to the field of information handling system network storage, and more particularly to a system and method for managing replication in an object storage system.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Large scale object storage systems, such as the DX6000 developed by Dell Inc., store information in a network "cloud" by using a universally unique identifier (UUID) token to store and retrieve the information. In order to prevent data loss, object storage systems may provide content replication between independent network locations, such as with many-to-many replication. In some instances, an application provides redundancy across network sites via multi-site writes, while in other cases, the storage subsystem provides redundancy across network sites by replicating objects at different network sites. Object storage systems protect against data loss by using RAID, RAIN or content replica-based policy storage to address data redundancy challenges at each network site location. With a content replica-based storage policy subsystem, a content addressed storage (CAS) policy typically replicates content based upon the UUID of the content and a cluster level policy that sets the number of replicas. For example, with a typical replica policy each cluster replicates each object at least twice at each independent network site. Creating redundant copies of the same object increases storage costs by eating up storage space, however, provides greater protection against potential data loss presented when only one copy is maintained.

Although cluster storage advantageously improves data security and flexibility, one difficulty with content addressed storage in a "cloud" network environment is managing the number of replicas where storage of a particular object is not tied to a physical storage device. This allows content objects to be distributed and re-distributed to enable load balancing by assigning a UUID token for content object access to each object written to object storage. Having multiple replicas at each site of network storage adds significant costs since each independent site lacks a co-relation between an object copy of different sites once replication is completed. Hence, if different independent sites replicate content to each other with two or more copies at each site, the number of replicas grows exponentially increasing total storage requirements. By comparison, applications that have no binding between sites and have a replica count set at 1 for a site can experience a silent data loss. For example, if the application is keeping a single replica at a remote site and a storage system failure occurs that results in a lost or corrupted replica, the failure may go unnoticed until the application attempts to access the data. End users of a content addressed storage system face the difficult choice of reducing costs by having one replica per site and accepting the risk of data loss, or accepting increased costs by having multiple replicas of content at each site in order to reduce the risk of data loss. For example, in one common configuration, two copies of a content object are maintained at a source site directly accessed by an application with two copies at each replica site so that the number of replicas grows to exponentially increase required storage size for a given set of data.

SUMMARY OF THE INVENTION

Therefore a need has arisen for a system and method which manages replication across the object storage system.

In accordance with the present invention, a system and method are provided which substantially reduce the disadvantages and problems associated with previous methods and systems for replicating information stored in an object storage system. A virtual identifier indicates the presence of a replica at a network location to prevent replication of an object when existing replicas provide adequate data availability. The virtual identifier applies at the node storing the object but is transparent to an application or node that attempts to access an object associated with the virtual identifier because an application accessing an identifier does not know if the identifier has actual content or virtual content. If the virtual identifier is called to provide an object, such as when another replica at a network location has become invalid, a replica is created and provided in response to the request for the virtual identifier.

More specifically, content addresses storage system stores objects at a network location by reference to a UUID unique identifier token. A publisher module at the network location publishes the object to a subscriber module of a distal network location so that the subscriber module creates a replica of the object at the distal network location to provide desired data redundancy. Network locations have a replica policy engine that calls for two or more copies of each object to be stored at each network location to prevent data loss, however, the replica policy engine intervenes to alter the replica policy if an object is itself a replica created as a redundant copy of an object at another network location. Instead of creating additional copies of an object sent for replication by a primary network location, the replica policy engine creates one replica at a secondary network location and "tricks" the secondary network location to believe that a second replica is created by reference to a virtual identifier. In the event that a replica object associated with a virtual identifier is called for retrieval, such as if the actual replica of the secondary network location becomes invalid, then the replica policy engine provides a high priority request for retrieval of the object from the primary network location to the secondary network location to create a replica for association with the virtual identifier.

The present invention provides a number of important technical advantages. One example of an important technical advantage is that improved management of replicas in an object storage system provides protection from data loss with reduced storage space requirements. A content addressed storage system creates a virtual identifier that has the UUID but lacks an associated object and therefore uses minimal storage space. This scheme allows the creation of an actual object (UUID) and a pointer (virtual UUID) to the actual object irrespective of the location of the actual object at a local or remote site. Monitoring of original content associated with the virtual identifier allows a timely creation of an actual content object for association with the virtual identifier should original content become unavailable. Adjusting storage priorities to allow for rapid replication when failure is detected results in minimal impact on system performance.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Replicas in an object storage information handling system having plural network locations are managed by creating virtual object identifiers at one or more network locations and creating an associated content object upon retrieval of the virtual object identifier. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (PO) devices, such as a keyboard, a mouse, and a video display. The information handling system may also include one or more buses operable to transmit communications between the various hardware components.

Figure 1:
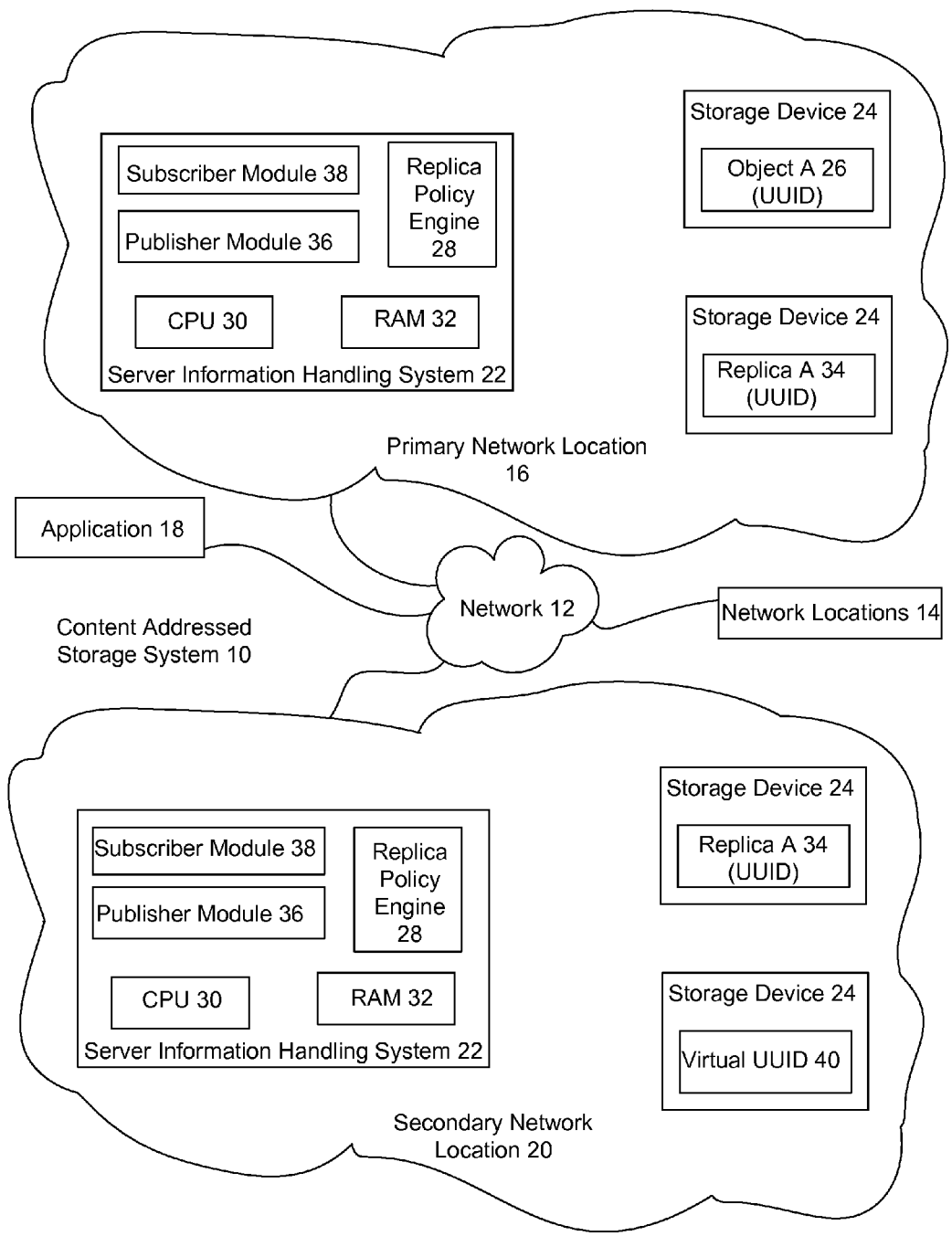
FIG. 1 depicts a block diagram of an object storage system that manages replication of objects to adjust storage usage.

Referring now to FIG. 1, a block diagram depicts an object storage system that manages replication of objects to adjust storage usage. Content addressed storage system 10 provides storage through a network 12 at plural network locations 14, such as a primary network location 16 accessed by an application 18 and a secondary network location 20 that provides redundancy for information stored at primary network location 18. For instance, application 18 executing on a client information handling system interfaces through network 12, such as the network, to communicate with primary network location 16, such as a storage area network having a server information handling system 22 and plural storage devices 24. Application 18 stores information on storage devices 24 by interacting through server information handling system 22. Information generated by application 18 is stored as an object 26 on one or more storage devices 24 and is tracked as content with a UUID token. A replica policy engine 28 executing on a CPU 30 and RAM 32 of server information handling system 22 generates one or more replica objects 34 that are stored by reference to a UUID on storage devices 24 of primary network location 16. By having a replica policy of 2 copies of each object on each primary network location, ready access to a redundant copy of the object is available in the event that the primary object becomes invalid.

In addition to maintaining an object 26 and replica 34 at primary network location 16, which is the source network location of application 18, content addressed storage system 10 also maintains a copy of object 26 as a replica 34 on secondary network location 20, which is remote to primary network location 16. A publisher module 36 executing on CPU 30 at primary network location 16 publishes object 26 to a subscriber module 38 running on CPU 30 at secondary network location 20. Replica policy engine 28 running on CPU 30 at secondary network location 20 detects publication by subscriber module 38 and manages the number of replica objects stored on secondary network location 20 according to a replica policy. For example, in order to conserve storage space replica policy engine 28 creates only one replica at secondary network location 20 when replica policy engine 28 detects that the replica supports a primary network location 16 that stores an object 26 and a replica 34. In order to "trick" content addressed storage system 10 into the desired replica policy, replica policy engine 28 creates a replica 34 tracked by a UUID and also creates a virtual UUID 40 that indicates a second replica was created even though the second replica is not created at secondary network location 20. Those of skill in the art will recognize that the term "virtual UUID" broadly references an indication of storage of an object that does not in fact exist, and may also be referenced as a virtual replica or similar term. The virtual UUID applies to the node that stores the virtual content, however, to other nodes or applications the virtual UUID appears as a valid UUID having associated content. The virtual nature of a UUID is transparent to applications and other nodes that want content associated with a UUID so that requests are made to the virtual UUID as if it is a standard UUID associated with the content. In operation, an HTTP request based upon content to a content addressed storage system returns a UUID token, which may be filled by any object having the UUID or an associated identifier to provide the content associated with the UUID.

During normal operations, three copies of object 26 exist for access by application 18 through a request of a UUID associated with the object 26. Application 18 is served by primary network location 16, which provides object 26 or replica 34 in response to a request for the stored information with a UUID ticket. In the event that object 26 and replica 34 of primary network location 16 is not available, content addressed storage system 10 will respond to the UUID token by providing replica 34 of secondary network location 20 as a redundant object to primary network location 16. Alternatively, application 18 can attempt to retrieve object 26 by making a request to secondary network location 20. During the retrieval process, if a fault is detected with the object replica 34 stored at secondary network location 20, replica policy engine 28 will attempt to generate a replica to associate with virtual UUID 40 so that secondary network location 20 can respond to the UUID with the virtual replica after creation of an actual replica object.

Replica policy engine 28 runs at each network location node 14, 16 and 20 to check replication policy and data integrity for each UUID residing on each node. A replica policy engine 28 learns of replica objects on other network locations from UUID mapping or via bidding. If a replica policy engine 28 cannot access the object associated with a UUID and the replica policy calls for 1 replica at a distal network location, then replica policy engine 28 determines that the UUID without a content object is a virtual UUID 40. If replica policy engine 28 detects that a UUID exists for a replica object but that no virtual UUID exists, then it bids out for a virtual UUID creation and the winning node bid stores the virtual UUID without a content object. As an example, this situation could arise if a replica is created to associate content with a virtual UUID in response to a request for content so that another virtual UUID is created after the replica is created. As an alternative example, an object with the actual UUID may be created so that the virtual UUID is left intact. If replica policy engine 28 detects that a virtual UUID exists but that no UUID exists, a high priority request is made to the source network location for the content object associated with the UUID to generate a replica at the secondary network location. If an application 18 requests content associated with a UUID from a secondary network location, the node with the virtual UUID 40 provides a lower priority response to the request than the node with the replica UUID 34 so that the node having an actual content object will win the bid to fill the request for the content object. If the replica UUID is not found or is not valid in response to the winning bid, then replica policy engine 28 initiates a high priority request to create a replica object associated with the virtual UUID 40 so that application 18's request for the content object can be filled with a content object associated with the virtual UUID.

Increased priority for a request to create a content object associated with a virtual UUID helps to limit delays for pending content requests. A "retry after timeout" error provided in response to a request for a content object indicates to the application 18 that only a virtual UUID was found and a delay will occur while the content object is retrieved from a source/publisher node to create a replica object associated with the virtual UUID. By the timeout time frame, the object from the source node is requested and another node within the subscriber network location stores the content and bids to fill the application request.

Figure 2:
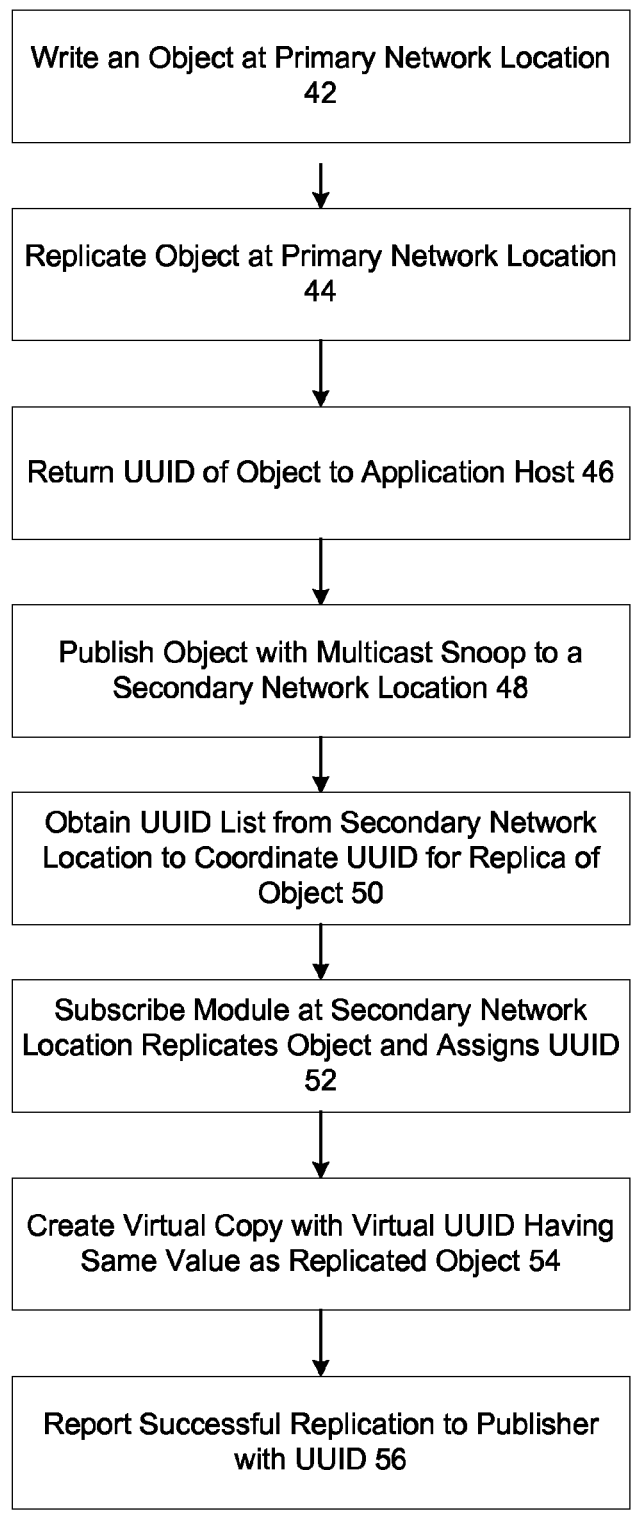
FIG. 2 depicts a flow diagram of a process for creating a virtual identifier to indicate multiple replicas at a secondary network location.

Referring now to FIG. 2, a flow diagram depicts a process for creating a virtual identifier to indicate multiple replicas at a secondary network location, even though no replica object exists for the virtual identifier. The process starts at step 42 with storage of a content object at a primary network location of an object storage system, such as a content addressed storage system. At step 44, the content object is replicated at the primary network location, such as another node within a cluster, so that a local redundant replica exists for the content object. At step 46, the UUID of the content object is returned to the application host. This allows the application to retrieve the content object by submitting the UUID and receiving in response the primary object or the replica object from the primary network location. At step 48, the content object is published via a multicast snoop or other mechanism to a secondary network location in accordance with a replication policy that has replicas created at distal network locations. At step 50, a UUID list is obtained from the primary network location to coordinate a UUID for a replica of the object at the secondary network location. At step 52, a subscribe module at the secondary network location replicates the object from the primary network location and assigns a UUID. The assigned UUID may be the same as that of the primary network location, a variant of the primary network location or otherwise associated with the UUID of the primary network location. At step 54, a virtual copy of the replica is created at the secondary network location by association with a virtual UUID having the same value as the replicated object but no content. At step 56, a successful replication of two copies of the content object is reported to the publisher along with the UUID.

Figure 3:
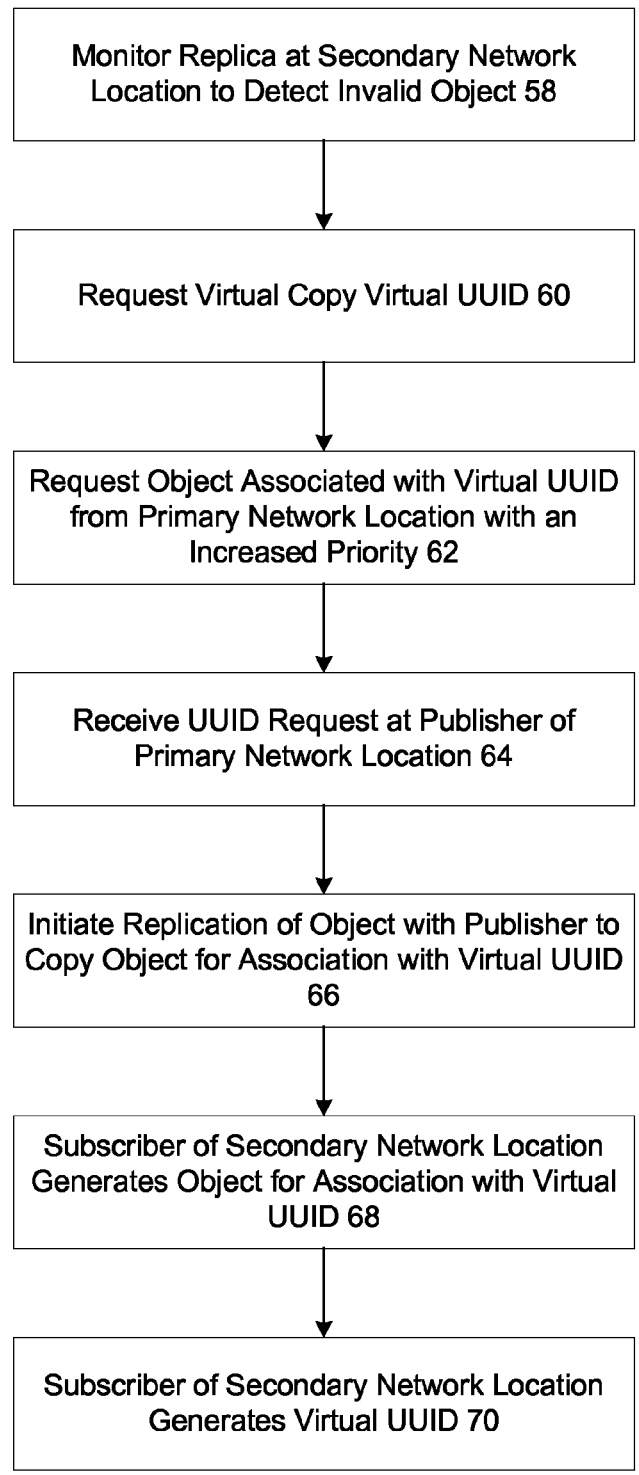
FIG. 3 depicts a flow diagram of a process of creating an object to associate with the virtual identifier if a virtual replica is called at a secondary network location.

Referring now to FIG. 3, a flow diagram depicts a process of creating an object to associate with the virtual identifier if a virtual replica is called at a secondary network location. The term "virtual replica" applies to nodes that store information or objects but is transparent to applications that use objects because the applications do not know the difference between a virtual and non-virtual UUID, but rather see virtual UUIDs as normal content source. The process begins at step 58 with monitoring of a replica at a secondary network location to detect an invalid content object. If an invalid replica is detected, the process continues to step 60 to request a virtual copy represented by a virtual UUID. At step 62, a request is made from the secondary network location to the primary network location for the content object associated with the virtual UUID. The request includes an indication of increased priority so that the content object is transferred in a more rapid manner relative to other requests for content objects. At step 64, the UUID request is received by the publisher of the primary network location. At step 66, the publisher of the primary network location initiates replication of the content object associated with the UUID from the primary network location to an object associated with the virtual UUID at the secondary network location. At step 68, the subscriber of the secondary network location generates a content object for association with the virtual UUID. At step 70, the subscriber of the secondary network location generates a virtual UUID to replace the virtual UUID that was just associated with a content object.

Figure 4:
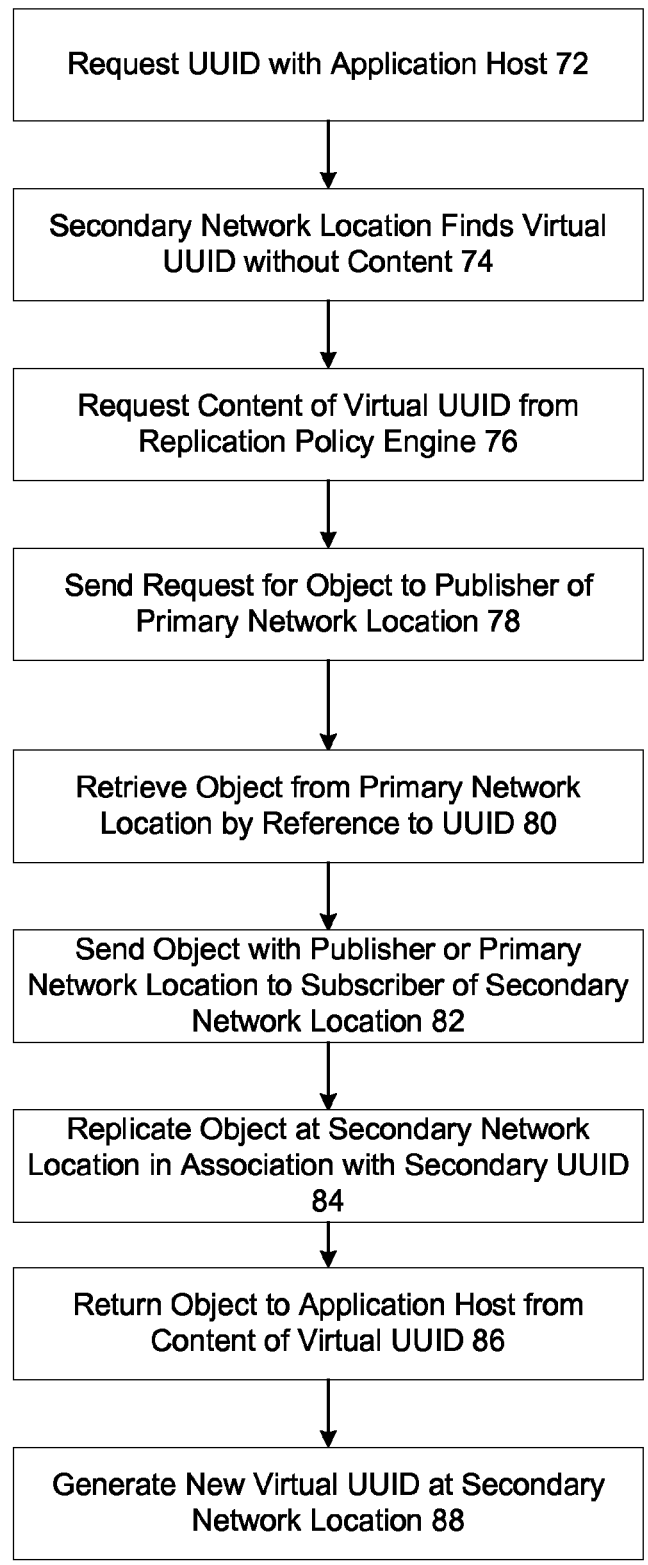
FIG. 4 depicts a flow diagram of a process of creating an object to associate with the virtual identifier if an application requests a virtual replica from the secondary network location.

Referring now to FIG. 4, a flow diagram depicts a process of creating an object to associate with the virtual identifier if an application requests a virtual replica from the secondary network location. The process begins at step 72 with a request for a content object by a UUID made from an application host. At step 74, the secondary network location finds a virtual UUID associated with the request and lacking content. Such a situation might arise if the node supporting the virtual UUID underbids the node supporting a replica object, but the replica object is found invalid so that the virtual UUID must provide a content object that does not actually exist. At step 76, the contend associated with the virtual UUID is requested from the replication policy engine of the secondary network location, which at step 78 sends a request for the content object to the publisher of the primary network location. At step 80, the publisher retrieves the content object form the primary network location by reference to the UUID and, at step 82 sends the content object with the publisher of the primary network location to the subscriber of the secondary network location. At step 84, the subscriber of the secondary network location replicates the object at the secondary network location is association the virtual UUID of the secondary network location. At step 86, the newly replicated object associated with the virtual UUID is provided to the application host in response to the request for the object from the secondary network location with the UUID. At step 88, a new virtual UUID is generated at the secondary network location to provide a redundant copy object for the newly generated replica object formerly associated with a virtual UUID.

Although the present invention has been described in detail, it should be understood that various changes, substitutions and alterations can be made hereto without departing from the spirit and scope of the invention as defined by the appended claims.

What is claimed is:

1. A method for storing information at plural network locations, the method comprising:
    storing information at a primary network location, the primary network location having a policy to create a replica of the information;
    storing a first replica of the information at the primary network location according to the policy;
    storing a second replica of the information at a secondary network location, the secondary network location having a policy to create a replica of the second replica;
    determining at the secondary network location that the first replica exists at the primary network location;
    in response to the determining at the secondary network location, suppressing generation of a third replica at the secondary network location;
    detecting a failure associated with the second replica; and
    in response to the detecting, generating the third replica at the secondary network location.

2. The method of claim 1 wherein the first and second network locations comprise an object storage system having content addressed storage.

3. The method of claim 1 wherein detecting a failure further comprises:
    attempting without success to retrieve the second replica within a predetermined time; and
    determining failure after the predetermined time.

4. The method of claim 1 wherein detecting a failure comprises:
    attempting to access the replica at the secondary network location; and
    failing to retrieve the replica in response to the attempting.

5. The method of claim 1 wherein detecting a failure comprises:
    monitoring the secondary network location for the presence of a unique identifier; and
    generating the third replica if the unique identifier is not present.

6. The method of claim 5 further comprising increasing a priority for generating the third replica if the unique identifier is not present.

7. A system for managing replication of information across plural network locations, the system comprising:
    a processor;
    a publisher module stored in non-transitory memory and running on the processor at a first network location and configured to store information at the first network location;
    a subscriber module stored in non-transitory memory and running on the processor at a second network location interfaced with the first network location, the subscriber module configured to create only a first replica of the information at the second network location if a replica of the information exists at the first network location and to create a first and second replica of the information at the second network location if a replica of the information does not exist at the first network location; and
    a replica policy engine interfaced with the subscriber module, the replica policy engine configured to detect an invalid first replica at the second network location and to create the second replica in response to detecting the invalid first replica and to create a virtual unique identifier associated with the second replica at the second network location without creation of the second replica at the second network location.

8. The system of claim 7 wherein the replica policy engine detects the invalid first replica by monitoring the status of the first replica.

9. The system of claim 7 wherein the replica policy engine detects the invalid first replica in response to a failed attempt by an application to retrieve the first replica.

10. The system of claim 7 wherein the first and second network locations comprise content addressed storage.

11. A method for managing replication of information at a first network location, the method comprising:
    setting the first network location to create at least one replica of information stored at the first network location;
    detecting that information stored at the first network location is a replica of information stored at a second network location;
    in response to the detecting, suppressing creation of a replica of the information at the first network location;
    retrieving the information from the primary network location to the secondary network location;
    storing the information at the secondary network location as the third replica; and
    increasing a priority for retrieving the information from the primary network in response to the failing to retrieve the replica.

12. The method of claim 11 further comprising:
    determining that the information stored on the first network location is not valid; and
    in response to the determining, creating the replica of the information at the first network location.

13. The method of claim 12 wherein determining further comprises detecting a failed attempt to retrieve the information stored on the first network location.

14. The method of claim 12 wherein determining further comprises monitoring the status of the information stored on the first network location to detect that the information stored on the first network location is not valid.

15. The method of claim 12 wherein in response to the determining, creating the replica at the first network location further comprises assigning an increased priority to the creating the replica.

16. A method for storing information at plural network locations, the method comprising:
    storing information at a primary network location;
    storing a first replica of the information at the primary network location;
    storing a second replica of the information at a secondary network location;
    determining at the secondary network location that the first replica exists at the primary network location;

in response to the determining at the secondary network location, suppressing generation of a third replica at the secondary network location;
attempting to access the replica at the secondary network location;
failing to retrieve the replica in response to the attempting;
in response to the failing to retrieve, retrieving the information from the primary network location to the secondary network location; and
storing the information at the secondary network location as the third replica.

17. The method of claim 16 further comprising increasing a priority for retrieving the information from the primary network in response to the failing to retrieve the replica.

18. A method for storing information at plural network locations, the method comprising:
storing information at a primary network location;
storing a first replica of the information at the primary network location;
storing a second replica of the information at a secondary network location;
determining at the secondary network location that the first replica exists at the primary network location;
in response to the determining at the secondary network location, suppressing generation of a third replica at the secondary network location;
detecting a failure associated with the second replica;
in response to the detecting, generating the third replica at the secondary network location;
wherein the in response to the determining at the secondary network location, suppressing generation of a third replica at the secondary network location further comprises:
detecting storage of the second replica at the secondary network location;
overriding a setting to create a copy of the second replica at the secondary network location; and
providing a virtual unique identifier to indicate that the third replica was created.

\* \* \* \* \*